United States Patent Office 3,786,019
Patented Jan. 15, 1974

3,786,019
FIRE PROTECTING PAINTS
Zhigniew Brzozowski, Warsaw, Jadwiga Kusmierek, Gdansk, and Stanislaw Porejko, Warsaw, Poland, assignors to Politechnika Warszawska, Warsaw, Poland
No Drawing. Continuation-in-part of abandoned application Ser. No. 47,604, June 18, 1970. This application Mar. 15, 1972, Ser. No. 234,998
Int. Cl. C08g 51/04
U.S. Cl. 260—37 EP          5 Claims

ABSTRACT OF THE DISCLOSURE

Fire resistant paints are prepared by mixing an epoxy resin obtained from epichlorohydrin and chlorobisphenol which contains chlorine in the side aliphatic radical, attached to the carbon atom joining the two aryl rings by a double bond, with an antimony or phosphorous compound and with known additives such as pigments, solvents, plasticizers, fillers and the like. The paints are cured conventionally, i.e. with an aliphatic or aromatic amine, an adduct of such amine with epoxy resins, adducts of such amines with alkyl ethers, polyaminoamides, or solutions of the above mentioned materials containing amino groups.

CROSS-REFERENCE TO RELATED APPLICATION

This application is a continuation-in-part of our earlier application Ser. No. 47,604, filed June 18, 1970, and now abandoned.

BACKGROUND OF THE INVENTION (a) Field of the invention

The present invention relates to fire-protecting paints adapted for covering metallic, wooden, ceramic, polyester laminate and other surfaces.

(b) Prior art

Heretofore, in order to increase the fire resistance of epoxy paints which are based on the conventional Bisphenol A epoxy resins, chlorine containing compounds, e.g. chloroparaffins, have been added thereto. Since the chlorine in said compounds is not structurally bound to the coat-creating substance, its ability to provide fire resistance is considerably limited.

There is known a method of preparing self-extinguishing epoxy resins, in which epichlorohydrin is reacted with chlorobisphenol obtained by the condensation of phenol with a chloroacetic aldehyde, or with a hydrate or acetal of the latter, or with such a chlorobisphenol when chlorinated. Although the resins have quite good mechanical properties, such as hardness, their thermal resistance is not sufficient because of the possibility of dehydrohalogenation of the chlorobisphenol at high temperatures.

It is also known to prepare flame-resistance polyepoxide compositions which can be converted with epoxy curing agents to form non-flammable insoluble and infusible products, which compositions comprise a mixture of a polyepoxide, and preferably a glycidyl polyether of a polyhydric phenol or alcohol and a flame-proofing amount of a halogenated beta-lactone.

SUMMARY OF THE INVENTION

It has now been found that effective fire protecting paints which do not have the disadvantages of the known methods can be prepared by mixing epoxy resins obtained from epichlorohydrin and chlorobisphenol, which contains chlorine in the side aliphatic radical, attached by a double bond to the carbon atom joining the two aryl rings with an antimony or phosphorous compound. Conventional additives such as pigments, solvents, plasticizers and fillers can also be added thereto.

The paints which are thus obtained are then mixed, for curing purposes with a curing agent such as an aliphatic or aromatic amine, and adduct of said amine with an epoxy resin, an adduct of said amine with an alkyl ether, polyaminoamides or solutions of the above mentioned products containing amino groups.

Depending on the number of amino groups contained in the hardener, i.e. the "amino number," the quantity by weight necessary for hardening the resin, varies considerably. For this reason the formulae of the various paints exhibit rather wide ranges of component contents.

As the epoxy resins, there are used the products obtained by the reaction of epichlorohydrin with the dehydrohalogenation product of the condensation product of phenol with chloral, i.e. bis(p-hydroxyphenyl)dichloroethylene. In order to make the paint less expensive, it is also possible to use resins obtained from a bis(hydroxyaryl)alkane. As the bis(hydroxyaryl)alkane, preferably Bisphenol A, i.e. bis(p-hydroxy-phenyl) propane or chlorinated Bisphenol A is used.

It has also been found that the use of an epoxy resin having an epoxy group content which is equal to 10–23% is of special advantage.

The paints of this invention contain 10–40 parts by weight of any epoxy resin obtained by reacting epichlorohydrin with bis(p-hydroxyphenyl)dichloroethylene, 5–15 parts by weight of a compound giving a fire extinction effect, i.e. an antimony or phosphorous compound, 10–40 parts by weight of a curing agent, preferably a polyaminoamide, and optionally 10–30 parts by weight of a filler, preferably chalk, solvents, plasticizers and pigments.

It is also possible to use bis(p-hydroxyphenyl)propane, which is of special advantage.

As the compound giving a higher fire extinction, the paints of this invention preferably contain antimony trioxide, antimony oxychloride, triphenyl phosphite, tricresyl phosphate or nonyl phosphite.

It should be understood that the improved characteristics flowing from the use of a resin containing chlorine in the side aliphatic radical, which is attached to the carbon atom joining the two aryl rings by a double bond, as the special formation of an intermolecular bond between $=CCl_2$ groups and the $=NH_2$ or $=NH$ groups of the curing agent which provide a higher thermal and fire-protecting resistance for the coating. In addition to the above, the chlorine contained in the resin creates, at elevated temperature, antimony or phosphorous compounds giving a higher fire extinction effect. In the paints according to the invention there thus occurs a double synergistic effect which increases the fire resistance of the paint.

DESCRIPTION OF THE PREFERRED EMBODIMENTS

The preferred embodiments of the paints according to the present invention will now be illustrated in the following examples which are not to be construed as limitative of the invention range but merely illustrative thereof.

EXAMPLE I

In 25 parts by weight of a solvent mixture consisting of 30% toluene, 30% methyl ethyl ketone or acetone, 10% cyclohexanol and 30% cyclohexanone, there are dissolved 22 parts by weight of an epoxy resin containing 18% of epoxy groups. The epoxy resin is obtained by the reaction of 3 moles of epichlorohydrin and 1 mole of 2,2 bis(p-hydroxyphenyl) 1,1-dichloroethylene in the presence of a 30% NaOH solution. To this mixture there are added 8 parts by weight of antimony trioxide, 23 parts by weight of titanium dioxide, 20 parts by weight of ground chalk and 2 parts by weight of 1% silicone oil which is an agent for enhancing the flow of the paint. The whole mixture is then dispergated in a conventional triturating device. Prior to the application of the paint on the surface to be coated, the thus prepared paint is mixed with 20 parts by weight of 50% polyaminoamide solution of the "Versamid" type.

EXAMPLE II

In 32 parts by weight of a solvent mixture consisting of 30% toluene, 30% methyl ethyl ketone, 30% cyclohexanone and 10% cyclohexanol, there are dissolved 38 parts by weight of an epoxy resin containing 12% of epoxy groups. The epoxy resin is obtained by the reaction of 3 moles of epichlorohydrin and 1 mole of 2,2 bis(p-hydroxyphenyl) 1,1-dichloroethylene in the presence of a 50% NaOH solution. To this mixture there are added 10 parts by weight of tricresyl phosphate, 15.5 parts by weight of titanium dioxide and 2.5 parts by weight of silicone oil, and the whole mixture is then dispergated in a triturating device. Prior to the application of the paint, the paint is mixed with 35 parts by weight with a 50% polyaminoamide solution of the "Versamid" type.

EXAMPLE III

The composition of the paint is the same as in Example I, but instead of 8 parts by weight of antimony trioxide there are used 6 parts by weight of antimony oxychloride.

EXAMPLE IV

The composition of the paint is the same as in Example I, but instead of 22 parts by weight of an epoxy resin based on 2,2 bis(p-hydroxyphenyl) 1,1-dichloroethylene, there are used 22 parts by weight of a resin obtained from 3 moles of epichlorohydrin and 0.8 mole of 2,2 bis(p-hydroxyphenyl) 1,1-dichloroethylene and 0.2 mole of 2,2 bis(p-hydroxyphenyl) 1,1-dichloroethylene and 0.2 mole of 2,2 bis(p-hydroxyphenyl)propane and instead of 8 parts by weight of antimony trioxide there are used 15 parts by weight of nonyl phosphite.

EXAMPLE V

The composition of the paint is the same as in Example I, but instead of 8 parts by weight of antimony trioxide there are used 8 parts by weight of triphenyl phosphite and instead of polyaminoamide as curing agent, there are used 5 parts by weight of an ethylamine-BF$_3$ adduct,

EXAMPLE VI

The composition of the paint is the same as in Example I, but instead of polyaminoamide as the curing agent, there are used 10 parts by weight of triethylenetetramine.

EXAMPLE VII

The composition of the paint is the same as in Example I, but instead of polyaminoamide as the curing agent, there are used 20 parts by weight of an adduct of triethylenetetramine and Bisphenol A epoxy resin.

The paints according to the present invention, illustrated in the above example exhibit unexpectedly advantageous properties in comparison with the known paints. In the following table are compared the test results of 3 groups of fire protecting paints:

(A) A paint of a conventional Bisphenol A epoxy resin together with a chloroparaffin ("Coreclor 70").

(B) A paint of an epoxy resin obtained from brominated Bisphenol A resin ("Epicote 1045").

(C) A paint of an epoxy resin obtained from epichlorohydrin and bis(p-hydroxyphenyl) dichloroethylene.

All the resins were mixed with antimony white, pigments and solvents. Before application of the paints to steel and wood surfaces, solutions of the above mentioned resins were mixed with a polyaminoamide of the Versamid 115 type which is a conventional curing agent for epoxy resins. The results of the application of these paints is shown in the following table.

TABLE

| Nature of the test | Type of paint | Results of tests |
|---|---|---|
| Thickness of the coat in microns | A | 145–150. |
| | B | 145–150. |
| | C | 145–150. |
| Resistance to the action of distilled water at 20° C. for 4 weeks. | A | No change in coating. |
| | B | Do. |
| | C | Do. |
| Resistance to the action of salt fog in a salt chamber of 8/24 cycles for 4 weeks. | A | Do. |
| | B | Do. |
| | C | Do. |
| Resistance to the action of fuel oil at a temperature of 20° C. for 4 weeks. | A | Do. |
| | B | Slight change of the color of the surface. |
| | C | No change in coating. |
| Resistance to the action of a 10% KOH solution at 50–60° C. for 8 hours. | A | Slight change of the color of the surface. |
| | B | No change in coating. |
| | C | Do. |
| Fire-protecting properties determined in a flame tube: | | |
| (a) Losses by weight in percent | A | 36. |
| | B | 7.6. |
| | C | 7.8. |
| (b) Behavior of the coating | A | Continues to burn even after removal of the burner. |
| | B | Flame flash stops after removal of the burner. |
| | C | Do. |

It is quite clear that paint C is unexpectedly superior, especially to paint B, since, as known, the fire resistance of bromine is about twice as high as that of chlorine, yet the resins according to the present invention have a lower chlorine content than do the brominated resins and nevertheless the fire protection effect is of the same order for the two resins.

What is claimed is:

1. A fire protecting paint comprising 10–40 parts by weight of an epoxy resin containing 10–23% of epoxy groups, obtained by the reaction of epichlorohydrin and chorobisphenol which contains chlorine in the side aliphatic radical, attached by a double bond to the carbon atom joining the two aryl rings, 5–15 parts by weight of an antimony or phosphorous compound as a fire-extinction compound, and 10 to 40 parts by weight of a curing agent which is an aliphatic or aromatic amine, or adducts of said amines with other organic or inorganic compounds, the balance being a filler in an amount of 10–30 parts by weight to make up 100%.

2. A fire protecting paint according to claim 1, wherein the epoxy resin is obtained by the reaction of epichlorohydrin with 2,2-bis(p-hydroxyphenyl 1,1-dichloroethylene.

3. A fire protecting paint according to claim 1, wherein the epoxy resin is obtained by reacting epichlorohydrin and bis(p-hydroxyphenyl)dichloroethylene and a bis(hydroxaryl)alkane.

4. A fire protecting paint according to claim 3 wherein the bis(hydroxyaryl)alkane is bis(p-hydroxyphenyl) propane.

5. A fire protecting paint according to claim 1 wherein the antimony or phosphorous compound is selected from the group consisting of antimony trioxide, antimony oxychloride, triphenyl phosphite, tricresyl phosphate and nonyl phosphite.

References Cited
UNITED STATES PATENTS

| | | | |
|---|---|---|---|
| 3,102,874 | 9/1963 | Bremmer | 260—47 EP |
| 3,501,436 | 3/1970 | Avis et al. | 260—37 EP |
| 3,452,116 | 6/1969 | Schwarzer | 260—47 ECX |
| 3,310,503 | 3/1967 | Huwyler et al. | 260—47 EPX |

LEWIS T. JACOBS, Primary Examiner

U.S. Cl. X.R.

260—47 EP